3,035,903
CARBON DIOXIDE ANALYZER
William M. Rand, Jr., Lincoln, Richard E. Rice, Arlington, Robert G. Shaver, Concord, and William E. Whitney, Belmont, Mass., assignors to Comstock & Wescott Inc., Cambridge, Mass., a corporation of Massachusetts
Filed Nov. 10, 1958, Ser. No. 772,910
3 Claims. (Cl. 23—255)

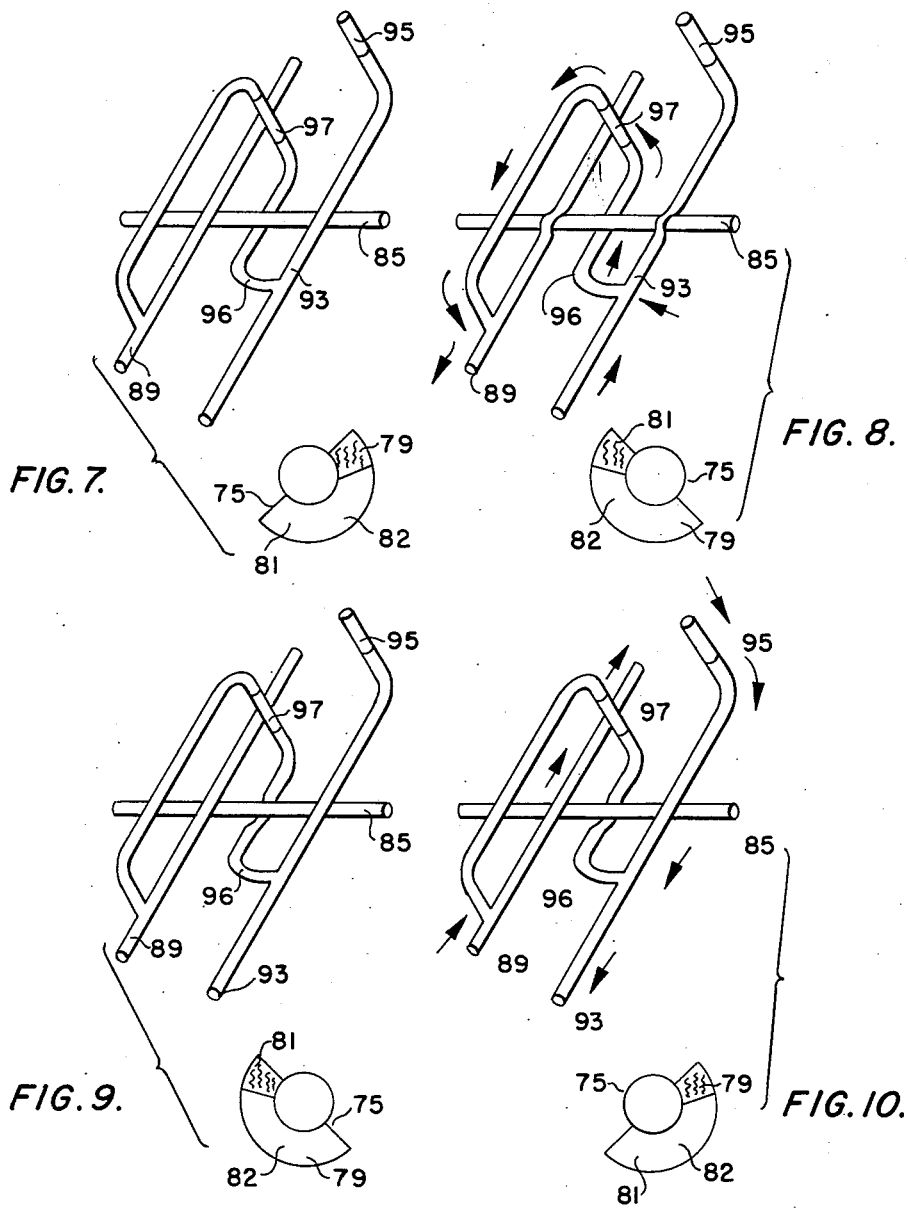

This invention relates to an improved method of determining the amount of carbon dioxide in a gas stream of an anesthesia system of the closed-circuit type, and in particular it relates to a novel apparatus which makes such a determination.

Industry has been confronted with a three-fold problem in their attempt to solve the difficulties of the anesthesiologist in the appraisal of the amount of carbon dioxide in the anesthesia system. First, a representative sample of the anesthesia gas stream must be acquired; second, the sample must be automatically analyzed for carbon dioxide quickly and accurately; third, the method of analysis must have utility in an operating room, the atmosphere of which may contain gaseous explosive components.

We have invented an apparatus which will determine the amount of carbon dioxide in the anesthetic gas stream of a closed-circuit rebreathing system, and not only will the determination be made accurately and quickly but also the apparatus may be manually activated into operation by one hand of the anesthesiologist. The accuracy of the present apparatus is about plus or minus 0.20% when the carbon dioxide content of the anesthesia stream is present in an amount up to about 15% by volume. This accuracy is not only unaffected by the presence of anesthetic concentrations of the conventional gaseous anesthetics such as nitrous oxide, cyclopropane, ether and the like, but also the accuracy is unaffected by the inherent differential pressure due to exchange of moisture between the stream and the absorbent because the stream is humidifiably conditioned prior to contact with the absorbent to nullify this effect. Also of importance is the fact that the apparatus is compact, light in weight, is constructed so that no static charge build-up will take place and does not depend upon electricity for its operation which makes it acceptable for use in the operating room.

In general, the process of the present invention comprises capturing a sample of gas from the anesthesia stream which is circulating in a rebreathing system of the closed-circuit type, contacting such sample with a humidifying agent which standardizes the moisture content of the sample, adjusting the pressure of the sample to substantially atmospheric pressure and treating a known volume of such standardized sample with an absorbent which preferentially extracts the volume of carbon dioxide present producing a pressure change in the standardized sample which is proportional to the carbon dioxide extracted, and measuring the pressure change produced by the said extraction.

More particularly, in the process of the present invention a representative sample of gas from an anesthesia stream, which is circulating in a rebreathing system of the closed-circuit type, and which contains carbon dioxide in an amount up to about 15% by volume, is captured. This representative sample is treated with an ammonium sulfate humidity conditioning agent whose function it is to standardize the humidity of the sample to substantially the same humidity as is in equilibrium with the carbon dioxide absorbent hereinafter described. The pressure of the sample is adjusted to substantially atmospheric pressure, and a known volume of said sample is contacted with a soda lime absorbent which preferentially extracts the carbon dioxide present in the sample producing a partial vacuum with a correlating decrease in the internal pressure of the sample which is measurable.

In theory, any humidity conditioning agent which if contacted with the gas sample would provide a humidity that is constant at a given temperature and which also corresponds to the humidity of the carbon dioxide absorbent, hereinafter described, is applicable in the present process. The humidity conditioning agent which has been preferentially utilized in the present process is a saturated aqueous solution of ammonium sulfate imbibed on ammonium sulfate crystals or granules. Ammonium sulfate has the advantage of being a cheap, readily available, crystalline salt that is, relatively non-corrosive and non-toxic.

The concentration of the saturated solution of ammonium sulfate which is deposited on the ammonium sulfate crystals or granules, is such that it will bring the relative humidity of the anesthesia gas with which it is contacted to between about 70% and about 90% relative humidity when the moisture content of the absorbent is between about 20% down to about 10%. Preferentially this humidifying agent should bring the moisture content of the treated anesthesia gas stream to a relative humidity of about 85% when the moisture content of the absorbent is about 15%.

Although many known absorbents may be utilized in the present process we have preferably utilized soda lime as the carbon dioxide absorbent. The character of soda lime is such that while it has little affinity for organic, neutral, non-polar gases which are present in the anesthesia gas stream, however, it does have a strong affinity for carbon dioxide, which is an acidic-type gas. Soda lime, because of its preferential absorption character has a greater performance reliability in anesthesia systems which are made up of varying components at ordinary room temperature.

It has been found that soda lime, which has a moisture content between about 10% and about 20%, may be utilized in the present process. If the moisture content is less than about 10% or more than about 20% there is a tendency for the soda lime to become ineffectual in absorbing carbon dioxide. Satisfactory absorptive characteristics were obtained when the moisture content of the soda lime is between about 14% and about 19%, with the optimum desirable carbon dioxide absorptivity being achieved when the moisture content of the soda lime was about 15%. It has been found that soda lime with a moisture content of about 15% will not add moisture to, not subtract from, a gas which has a relative humidity of about 85%. It is the function of the aforedescribed ammonium sulfate humidifying agent to preferably bring the captured sample, which contains carbon dioxide, to approximately this humidity.

As a result of the extraction of carbon dioxide from the gaseous sample a partial vacuum is produced therein which is not only measurable but is also directly correlatable to the amount of carbon dioxide extracted therefrom. It has been found that this measurement may be made with a high degree of accuracy by a number of conventional means, because any inherent error due to an inherent loss or gain in pressure resulting from the transfer of water vapor between the sample and the carbon dioxide absorbent, is nullified because the humidity of the gas has been standardized prior to contact with the absorbent.

In describing the apparatus of the present invention, which utilizes the aforedescribed process of determining the amount of carbon dioxide in the anesthesia system, reference will be made to the accompanying drawings, of which:

FIGURES 5 through 12 are diagrammatic flow diagrams illustrating the sequential relation of the pump to the control mechanisms and showing the direction of flow of the gas through the displacement system.

Figure 1:
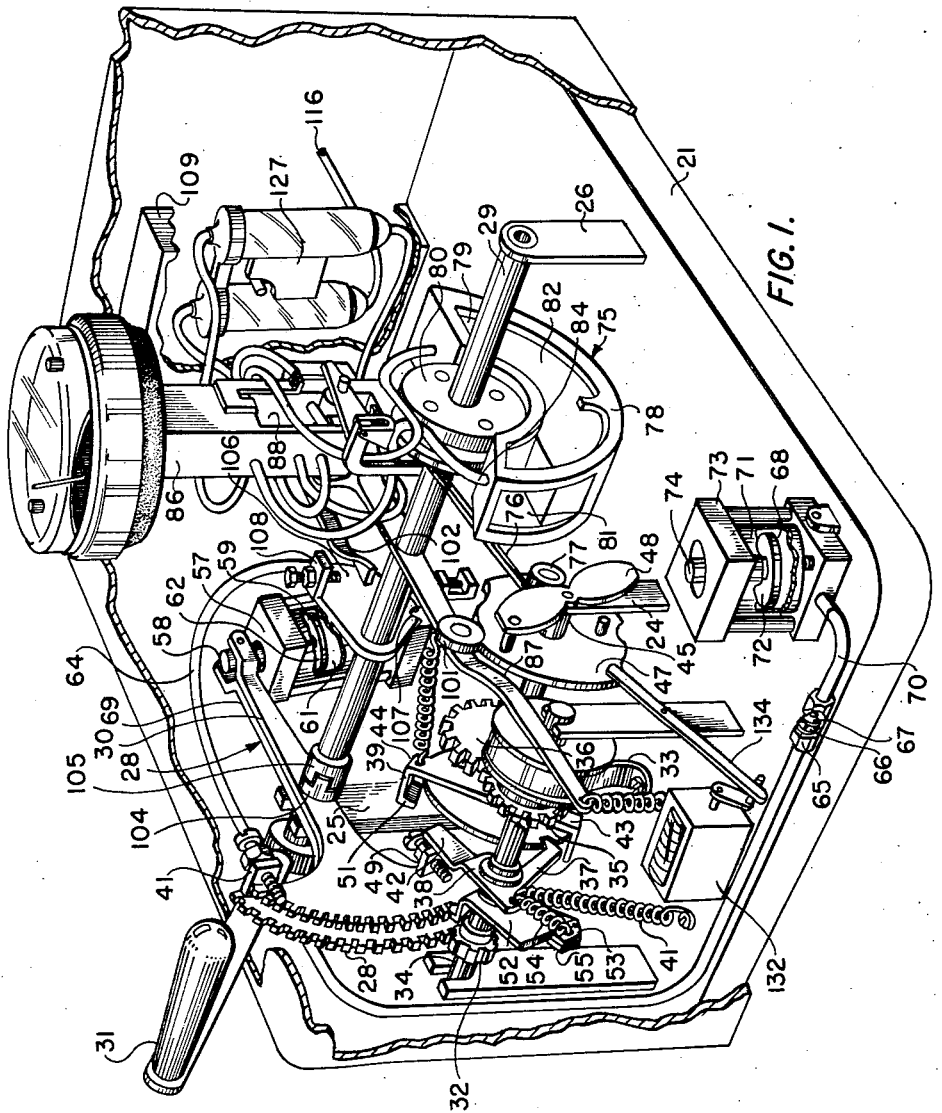
FIGURE 1 is a perspective view of the apparatus with the cover broken away showing the complete assembly of the same.

The apparatus of the present invention as illustrated in FIGURE 1 comprises a base 21 surmounted with mounting plates 22, 23, 24, 25, 26 and provided with cover 27. Segment gear 28 mounted on shaft 29, journaled on mounting plates 25, 26, is actuated by handle 31 and co-operates with spur gear 32 in energizing spring motor 33 through shaft 34. Many types of spring motors may be utilized in the present apparatus without departing from the spirit of invention embodied therein, although we have preferentially utilized a spring motor which has substantially a constant torque.

Drive Cycle and Regulator Thereof

Spring motor 33 mounted on shaft 34, cooperates with one-way clutch 35 to drive meshing gear 36 when cam lock arm 37 of the bifurcated pivotal lever 38 is disengaged from the retaining slot of circular cam 39.

The cam lock arm 37 of the bifurcated pivotal lever 38 in its normal position, i.e., when the machine is at rest or when handle 31 is depressed less than its maximum leverage point, engages the retaining slot of circular cam 39, and is held in position by tension spring 41. When handle 31 is depressed, pressure bar 41, extending laterally from the upper portion of segment gear 28, contacts and depresses release arm 42 of the bifurcated pivotal lever 38 pivoting it on shaft 34 and forcing the cam lock arm 37 out of engagement with the retaining slot of circular cam 39, at which time the contact arm 43 of spring loaded pivotal lever 44 will hold cam lock arm 37 out of engagement with the retaining slot of circular cam 39. Gear 36 mounted on shaft 45, journaled on plate 46, rotates cam 47 and cam 48 one cycle, at which time pressure bar 49, extending laterally from the lower portion of segment gear 28, contacts the release arm 51 of the pivoting pivotal lever 44 on shaft 34 forcing the contact arm 43 out of engagement with the cam lock arm 37 allowing the same to return to its normal position.

One-Way Drive Control

The function of pivotal locking lever 52 is to control the direction of movement of segment gear 28 to an upward movement when cam lock arm 37 is disengaged from the retaining slot of circular cam 39 thereby preventing the mechanism from being thrown out of sequence by the accidental recocking of the driving mechanism while the same is going through its driving cycle.

Pivotal locking lever 52, journaled on shaft 34, is held in position with relation to bifurcated pivotal lever 38, by means of the action of adjustable stop 53 and spring 54, such that locking lever 52 co-acts in movement with the bifurcated pivotal lever 38. Adjustable stop 53, mounted on arm 55 of pivotal locking lever 52, is held in contact with the periphery of the bifurcated pivotal lever 38 by means of tension spring 54.

Pivotal locking lever 52 in its normal position i.e. when the machine is at rest or when handle 31 is depressed less than its maximum leverage point, is pivoted out of engagement with the teeth of ratchet 30 attached to segment gear 28 and is held out of engagement by means of adjustable stop 53 contacting the periphery of arm 37 of the bifurcated pivotal lever 38. When cam lock arm 37 is forced out of engagement with the retaining slot of circular cam 39, pivotal locking lever 52 will pivot on shaft 34 and will engage the teeth of ratchet 30 attached to segment gear 28.

The toothed periphery of segment gear 38 will be prevented from entering a downward movement due to the contact of locking lever 52 with the teeth of ratchet 30, attached to segment gear 28. The position of engagement of pivotal locking lever 52 with the teeth of ratchet 30 is such that the toothed periphery of ratchet 30 will only be allowed, at this point, to move in an upward direction even though a downward torque is applied to handle 31.

At the end of the driving cycle of segment gear 28, cam lock arm 37 will again engage circular cam 39 and pivotal locking lever 52, co-acting therewith, will return to its normal disengaged position.

Drive Speed Control

The drive speed of spring motor 33 is controlled by hydraulic dash-pot pump 57 through connecting rod 58 cleaved to segment gear 28 co-acting with gear 32 to regulate the rotation of shaft 34 on which gear 32 is mounted. This invention includes in its scope any dash-pot pump which would control the speed of the spring motor, although we have preferentially utilized a hydraulic type dash-pot pump in the present described embodiment.

The hydraulic dash-pot comprises cylindrical housing block 59 within which is housed cylindrical bore 61 adapted to receive piston 62 provided with connecting rod 58. The upper extremital end of housing block 59 is provided with cover cap 63 through which connecting rod 58 operably extends.

The valve control, communicating with cylindrical housing block 59 through tube 64, comprises valve housing 65 within which is housed one-way valve 66 and needle valve 67. The function of one-way valve 66 is to allow the transfer of hydraulic fluid only from cylindrical bore 61 through tube 64 one-way valve 66 tubing 70 into reservoir 68. The function of needle valve 67 is to regulate the rate of flow of hydraulic fluid from reservoir 68 through tube 70 needle valve 67 tube 64 into cylindrical bore 61.

The hydraulic fluid receiver, which is used to store the hydraulic fluid, comprises housing 71 within which is housed reservoir bore 68 adapted to receive piston 72 which rides on the hydraulic fluid and forms an air tight seal for such fluid. Reservoir bore 68 is also provided with capping section 73 through which adjustable rod 74, connected to piston 72, also extends.

When handle 31 is depressed, connecting rod 58 is subjected to an upward pulling action because its cleave attachment point on arm 69 of segment gear 28 is raised due to the pivoting of segment gear 28 on shaft 29. The upward torque exerted in connecting rod 58 is in turn communicated to piston 62, to which said rod is attached, and piston 62 ascends in cylindrical bore 61 creating an upward force which drives hydraulic fluid contained in cylindrical bore 61 through tubing 64, one-way valve 66, tubing 70 into reservoir 68.

In driving, energized spring motor 33, in FIGURE 1, rotates shaft 34 and gear 32, mounted thereon, co-acts with segment gear 28 resulting in a downward movement of segment arm 28 due to the pivoting of segment gear 28 on shaft 29. When segment gear 28, in FIGURE 1, is subjected to a downward movement, piston 62 is forced to descend in cylindrical bore 61 by connecting rod 58 which is cleaved to segment gear 28. As piston 62 is forced to descend in cylindrical bore 61 it creates suction which draws fluid from reservoir 68 through tube 70 into the valve control housing 65. At this point in the operation, one way valve 66 will be closed by the force of the flow of the hydraulic fluid, and the hydraulic fluid will be directed to needle valve 67 which will control the rate of flow of the hydraulic fluid through tubing 64 again into cylindrical bore 61.

Pump

Figure 2:
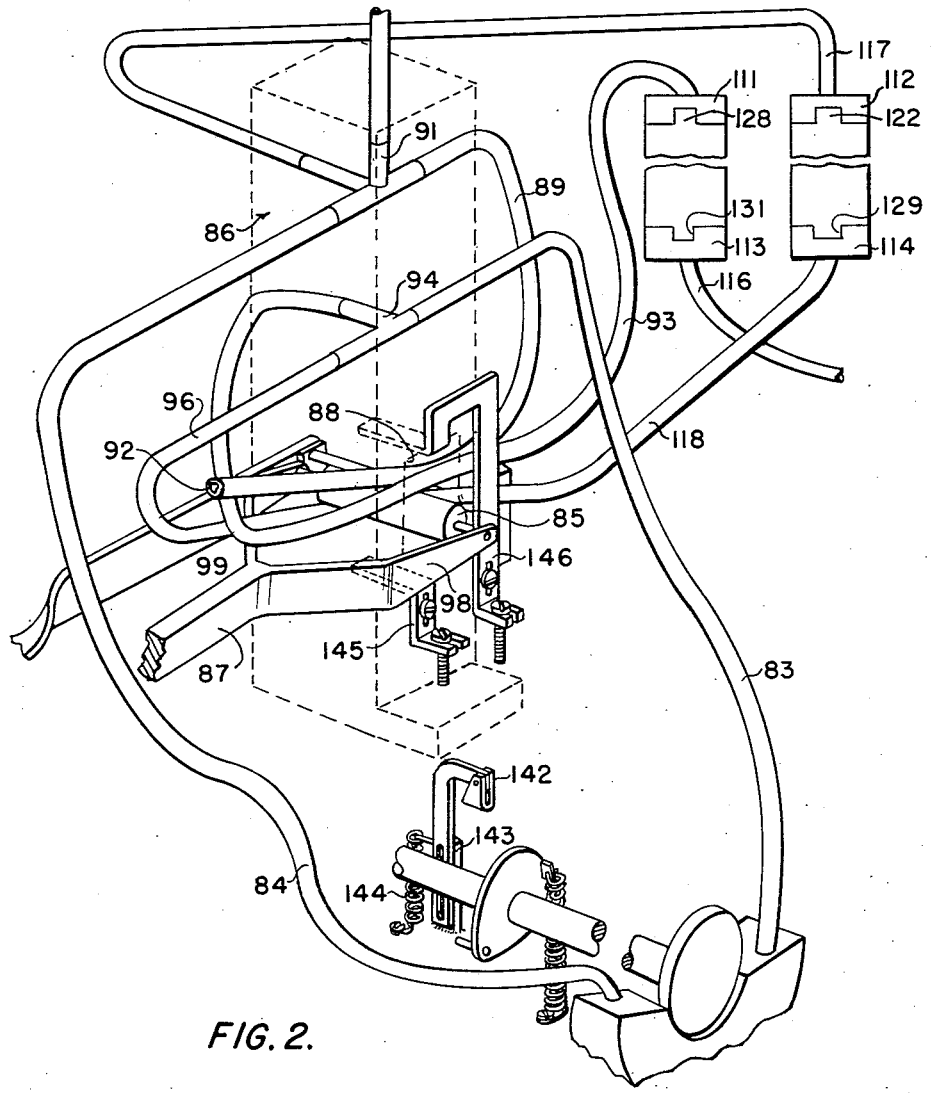
FIGURE 2 is a perspective view of the displacement system of the apparatus showing control mechanism in relation to the tubular displacement circuit.

Mercury displacement pump 75, whose function it is to draw a sample of the anesthesia stream into the tubular displacement system, illustrated in FIGURE 2 and to displace the same through such tubing system, is oscillated on shaft 29 by spring-loaded pivotal lever 76 whose follower roller 77 rides butterfly cam 48. The shape of the periphery of butterfly cam 48 is such that follower roller 77 will impart motion to pivotal lever 76 which in turn will pivotally oscillate the mercury displacement pump 75 through two cycles of a pendulum movement for every complete revolution of butterfly cam 47. The pump 75 may be any one of a number of conventional pivotal pumps but we have preferentially utilized a mercury piston loaded displacement pump.

The mercury displacement pump 75 comprises a piston housing 78, having interconnected dual displacement chambers of equal volume, 79 and 81, suspended so as to pivot from shaft 29 by arm 80. A volume of mercury is contained in piston housing 78 and serves as a common piston for displacement chambers 79 and 81 and the difference in volume of the mercury piston 82 in relation to the sum of the volumes of displacement chambers 79 and 81 is equal to the amount of gas which is desired to be displaced through the tubing system which is between about 10 cc. and about 50 cc. with the preferential volume being about 20 cc.

When the mercury displacement pump 75 is in its normal position mercury piston 82 will fill chamber 79 and a void will exist in chamber 81. As pivotal oscillation is imparted to arm 80, by spring-loaded pivotal lever 76, piston housing 78 will oscillate through a pendulum movement and substantially equal volumes will be displaced in sequence from chamber 79 and then chamber 81.

In the first one-half cycle of movement of the mercury displacement pump 75, piston housing 78 will swing to one side on arm 80 and the mercury piston will fill the void in chamber 79 resulting in a compression being communicated to the tubing system through tube 83, and simultaneously will evacuate chamber 81 creating suction which is communicated to the tubing system through tube 84 drawing a sample of the anesthesia gas into chamber 81.

In the second one-half cycle of movement, piston housing 78 will swing to the opposite side on arm 80 and the mercury piston will fill the evacuation in chamber 81 displacing the gas contained therein through tube 84 into the tubing system, and simultaneously will evacuate chamber 79 creating a suction which is communicated through tube 83 to the tubing system drawing a sample of anesthesia gas from the system through tube 83 to chamber 79.

On the third one-half cycle of movement, piston housing 78 will swing to the same side as in the first one-half cycle of movement and the mercury piston will fill the evacuation in chamber 79 displacing the gas contained therein through tube 83 into the tubing system, and simultaneously will evacuate chamber 81 creating a suction which is communicated to the tubing system through tube 84 drawing a sample of the anesthesia gas into chamber 81.

The fourth one-half cycle of movement of the mercury displacement pump is substantially the same as the second one-half cycle of movement.

While motion is being imparted to the mercury displacement pump 75 by means of shaft 45 on which cam 47 is mounted, motion is also simultaneously being imparted to control bar 85, adapted in housing 86 by means of bifurcated pivotal lever 87 riding on cam 48 which is also mounted on shaft 45.

Mercury Safety Control

As is illustrated in FIGURE 1, tube 84 communicating between chamber 81 of the mercury displacement pump 75 and the tubular displacement system traverses the upper portion of pump arm 82, and also tube 83 communicating between chamber 79 and the tubular displacement system traverses over the upper portion of pump area 82 in proximity to tube 81. To facilitate an assurance that the mercury in piston housing 78 will not flow from such housing into the tubular displacement system when the machine is raised from its normal position, tubes 83 and 84 are provided with a common pressure bar whose function it is to cut-off flow through tubes 83 and 84 when the machine is raised from its position.

The pressure cut-off bar 142, which perpendicularly traverses over tubes 83 and 84 is held in position by spring loaded support bar 143. Support bar 143 is positioned substantially perpendicular to and extends through base 21, and rests on the surface upon which the machine is surmounted, and such bar 143 is held in position by tension spring 144. As the machine is lifted from the surface upon which it is surmounted tension spring 144 exerts a downward torque and pulls upon support bar 143 so that a pressure bar 142 pinches tubes 83 and 84 shut thereby preventing the flow of mercury from either chamber 79 and 81.

Control System

Housing 86 provided with control chamber 88, surmounted on base 21 supports the tubular displacement system through which the anesthesia gas is displaced, as illustrated in FIGURE 1 and FIGURE 2. Three flexible sections of this tubular system transverse through pressure chamber 88, as illustrated in FIGURE 2. The first section 89 communicates between the four-way intersection 91 and the exhaust passage 92; the second section 93 communicates between the three-way intersection 94 and the inlet passage of the humidity control cartridge 95, while the third section 96 communicates between the three-way intersection 94 and the absorbent cartridge 97. The pressure control system comprises control bar 85, journaled between the rocking arms, 98 and 99, of the bifurcated pivotal rocking lever 87, which oscillates through an upward and downward movement in pressure chamber 88. Control bar 85 transverses through pressure chamber 88 and its length is positioned perpendicularly to the length of the three flexible sections which also transverse the chamber such that the flexible sections 89 and 93 which communicate with the inlet passage and exhaust passages respectively are positioned above the control bar 85 while the flexible section 96 which communicates with the absorbent cartridge 97 is positioned below said control bar. The upward and downward oscillation of control bar 85, which regulates the flow of gas through these aforesaid sections is regulated by pivotal rocking lever 87 whose roller follower 101 rides cam 48. The shape of the periphery of cam 48 is such that follower roller 101 which rides thereon imparts 2 cycles of three positions each to control bar 85 through pivotal rocking lever 87 for every complete revolution of cam 48. The three positions imparted to control bar 85 correlate either (1) to complete the opening of all of the flexible sections; (2) to the closing of section 89 which communicates with the exhaust passage 92 and a closing of the inlet passage 93 which communicates with the humidity control cartridge 95, and to the simultaneous opening of section 96 which communicates with the absorbent cartridge 97; or (3) to the closing of section 96 communicating with the absorbent cartridge 97 but with a simultaneous closing of section 89, which communicates with the exhaust passage 92 and an opening of the passage 93 which communicates with the humidity control cartridge 95 of the gas conditioning unit.

Tubular Alignment Plates

The present machine is provided with adjustable alignment plates whose function it is to aid in maintaining a substantially uniform tubular alignment within pressure chamber 88. Adjustable angle plate 145 is placed in position on the side of housing 86 such that one section of it extends into pressure chamber 88 but is positioned below flexible tubular section 96, and such that another section of plate 145 is adjustably mounted on the side of housing 86 as is illustrated in FIGURE 1. Adjustable angle plate 146 is also placed in position on the side of housing 86 so that one section of it extends into pressure chamber 88 but is positioned above both flexible tubular sections 93 and 89, and so that another section of plate 146 is adjustably mounted on the side of housing 86, as is also illustrated by FIGURE 1.

Although frequent use causes flexible tubing to exhibit a tendency to warp slightly, the adjustable plates minimize warping effects and safeguard the accuracy of the machine even though it is subjected to long and continued use.

Pressure Reading

One of the conduits of the four-way intersection 91, as illustrated in FIGURE 2, is provided with a vacuum gauge of the Magnehelic type whose function it is to indicate the pressure change due to the extractions of carbon dioxide from a sample being displaced through the tubular displacement system. Any one of a number of devices which measure low vacuum changes may be utilized in the present invention but we have preferentially utilized a Magnehelic type gauge in the present embodiment which is calibrated to indicate the change in pressure in related percent carbon dioxide extracted from the displaced sample.

Handle Positioning

There exists an area of clearance, between the fingers of interlocking grip 104 and the fingers of interlocking grip 105, of such a magnitude that handle 21 is allowed to be moved to a position so that it is perpendicular to the horizontal base of the machine and in which position the machine may normally be carried without encountering any inherent damage to the mechanism.

Valve Release

Interlocking grip 104, fused to handle 31, engages interlocking grip 105 when handle 31 is depressed to its maximum leverage point. Index control 106, attached to interlocking grip 105, is in the shape of a segment whose periphery contains a slot which receives a spring-loaded stop 107 when handle 31 is in position perpendicular to the horizontal base of the machine. When handle 31 is moved from its perpendicular inactivated position to its maximum leverage point, spring-loaded stop 107 is depressed by the movement of the periphery of index control 106 and in such depressed position travels over the periphery of said index control during its movement.

Adjustable pressure bar 108 extends laterally from the upper portion of index control 106 and contacts slotted indexing plate 102 resulting in control bar 85 being moved to a neutral position in control chamber 88 when handle 31 is moved to a position perpendicular to the horizontal base of the machine. When control bar 85 is in a neutral position in control chamber 88 the three flexible tubes transversing control chamber 88 will not be pinched shut. The function of indexing plate 102 is to index control bar 85 to a neutral position thereby aiding in facilitating the relief of pressure in the tubular system and to prevent such tubes from undergoing a set which would otherwise impair the flow of gas through the system and the responsiveness of operation of the machine. Adjustable pressure bar 108 is withdrawn from contact with slotted indexing plate 102 when interlocking grip 105 is engaged by interlocking grip 104 due to the depression of handle 31 to its maximum leverage point. When pressure bar 108 is withdrawn from contact with indexing plate 102, control bar 85 is allowed to be oscillated in an upward and downward movement by the action (aforedescribed) of pivotal rocking lever 87. After the machine has progressed through its driving cycle, handle 31 may be again moved to its perpendicular position at which point indexing plate 102 will bring pressure bar 108 to a neutral position in control chamber 88.

Conditioning Assembly

Figure 3:
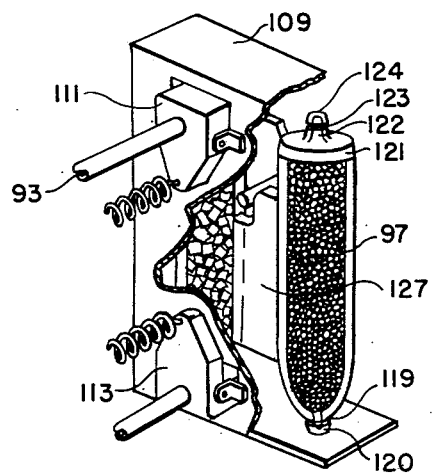
FIGURE 3 is also a perspective view of the dual gas conditioning unit in relation to its mounting with sections of the mounting and unit broken away to show the interior thereof.
Figure 4:
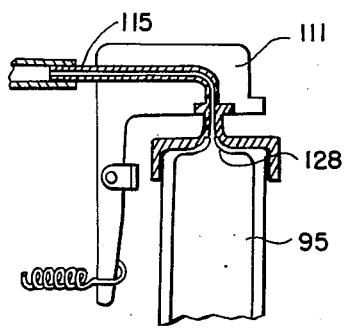
FIGURE 4 is a side sectional plan view of one of the receivers showing it in its position on one of the cartridges of the dual conditioning unit.

The gas conditioning assembly, illustrated in FIGURES 2 and 3, comprises a mount housing 109 provided with four-spring loaded receivers 111, 112, 113, 114, whose function it is to retain the gas conditioning units 95 and 97 in a substantially air-tight position in relation to the displacement circuit of the present apparatus when these units are surmounted on housing 109. Each of the receivers, for example 111 illustrated in FIGURE 4, contains a passage-like conduit, for example 115, which communicates with the gas displacement system. The conduit 115 in receiver 111 communicates with the inlet passage 93 transversing the control chamber 88 while the conduit 116 in receiver 113 communicates with the rebreathing system (not shown). Also the conduit 117 in receiver 112 communicates with the four-way intersection 91 and the conduit 118 in receiver 114 communicates with the passage which transverses the control chamber and it is connected to the three-way intersection.

Conditioning Unit

The gas conditioning units 95 and 97 respectively house the humidifying agent and the absorbent agent utilized in the present apparatus and these units may be constructed from glass, polyethylene or any one of a number of plastic type materials which are not susceptible to reaction with caustic materials. One of the functions of these units is to prevent atmospheric contamination of the charges contained therein. Units 95 and 97 may be any one of a number of hollow housings, which would perform the aforesaid function. These may be of either closed end construction or in the alternative open end construction provided with end sealing members, as long as the extremital ends of said units are adapted to fit operatively into the spring-loaded receivers mounted on housing 109.

In the present embodiment we have preferentially utilized a hollow cylindrically shaped cartridge for units 95 and 97, as illustrated in FIGURE 3. One end of each of the aforesaid cartridges, for example cartridge 97, is closed and has the shape of a tapered cone whose outer convex surface is circumferentially grooved, for example 119, in close proximity to the apex 120 of the cone. The function of the groove is to aid in the removal of the apex of the cone from the cylindrical cartridge. The opposite end of each of the aforesaid cartridges, for example cartridge 97 is provided with a capping section, for example 121, of hollow cylindrical shape and of closed end construction, as illustrated in FIGURE 3. The capping section 121, whose diameter is substantially the same as the diameter of the hollow cartridge 97, is affixed to the cartridge after its respective charge is placed therein. The closed end of the capping section 121 is provided with a hollow tubular member 122, one end of which communicates with the area inside the cartridge when the capping section is affixed to the cartridge, and the other end which is closed. The outer convex surface of the hollow tubular member 122 is provided with a circumferential groove 123 positioned in close proximity to closed end of the tubular member. The function of this groove is to aid in the removal of the closed end 124 from the tubular member 122.

The function of cartridge 95 is to house the humidity control charge and it is adapted to receive a charge volume between about 10 cc. and about 20 cc. with the preferential charge volume being about 10 cc. A volume substantially less than about 10 cc. would be unreliable in humidifying the gas displacement sample with which the charge is contacted whereas a charge volume greater than about 20 cc. would be impossible to purge. The function of the humidifying charge is to adjust the moisture content of the gas, with which it is contacted, to equilibrium with the moisture in the absorbent charge contained in cartridge 97. The humidifying agent preferentially utilized as charge is moist ammonium sulfate.

The function of cartridge 97 is to house the absorbent charge and it is adapted to receive a charge volume between about 5 grams and about 30 grams with the preferential charge volume being about 10 grams. The function of the absorbent charge is to substantially extract the carbon dioxide from any of the anesthesia gas to which it is contacted. A charge volume of less than about 5 grams of soda lime would present too small a surface for absorptive utility in the present apparatus and hence would be unreliable in analytically extracting the carbon dioxide from the gas displacement sample whereas a volume greater than about 30 grams would be ineffectively purged. The charge volume of about 10 grams would provide 100 analyses averaging about 5% in carbon dioxide with a safety margin of about 50 analyses before the accuracy of the apparatus is affected significantly.

In practice, either the humidity cartridge 95 or the absorbent cartridge 97 may be stored prior to use and the effective reaction capacity of their respective charges will not be altered. When the anesthesiologist desires to utilize either cartridge, for example cartridge 97, in the present apparatus he merely removes cone apex 120 and the closed end 124 of the tubular member 122 of the cartridge and mounts the cartridge in the receivers on housing 109. The cone apexes and the closed ends may be easily removed by applying a slight pressure thereto with an appropriate implement, for instance a knife. When cone apex is removed from its cartridge an apex orifice, which communicates with the charge in the cartridge, is opened which is substantially of the same area as the base of the removed cone apex.

Spring-loaded receivers 113 and 111 respectively are adapted to receive the apex orifice 131 and the hollow tubular member 128 of humidifying cartridge 95 when such cartridge is mounted on housing 109. Also spring-loaded receivers 114 and 112 respectively are adapted to receive the apex orifice 129 and the hollow tubular member 122 of the absorbent cartridge 97 when such cartridge is mounted on housing 109. It has been found that either of these cartridges may be mounted as two separate units on housing 109 or they may be mounted as a dual unit. The deciding factors determining whether two single units or a dual unit are utilized would be economics and convenience. If a dual unit is utilized as illustrated in FIGURE 3, the outer convex surface area of the units, i.e. cartridges 95 and 97, may be interconnected by a key-holed spacing segment 127. The function of the spacing segment 127 is to align cartridges 95 and 97 in relation to each other so that when the dual unit is surmounted on housing 109 orifices 129 and 131 will operatively fit respectively into receivers 114 and 113 and hollow tubular members 122 and 128 will operatively fit respectively into receivers 112 and 111.

The gas conditioning units of the present apparatus are not only novel but are very practical for use in conjunction with the present apparatus and are comparatively easy to fabricate by conventional process such as molding or extrusion. The cartridges are very easy to mount on the present apparatus and replacement is comparatively simple. For ease of operation and convenience the anesthesiologist does not have to replace the cartridges individually but may mount or replace these cartridges as a dual unit. The unit may be changed after a periodic lapse of time or after the machine has cycled through its operation a set number of times as indicated by a meter, such as meter 132, illustrated in FIGURE 1, which is actuated by shaft 45 through meter arm 134. The anesthesiologist may always feel certain that the gas sample is properly conditioned as it flows through the displacement system if effective conditioning charges are mounted in the circuit. If any doubt exists as to the efficiency of the operation the unit should be replaced immediately.

*Flow Diagram*

Figures 5, 6:
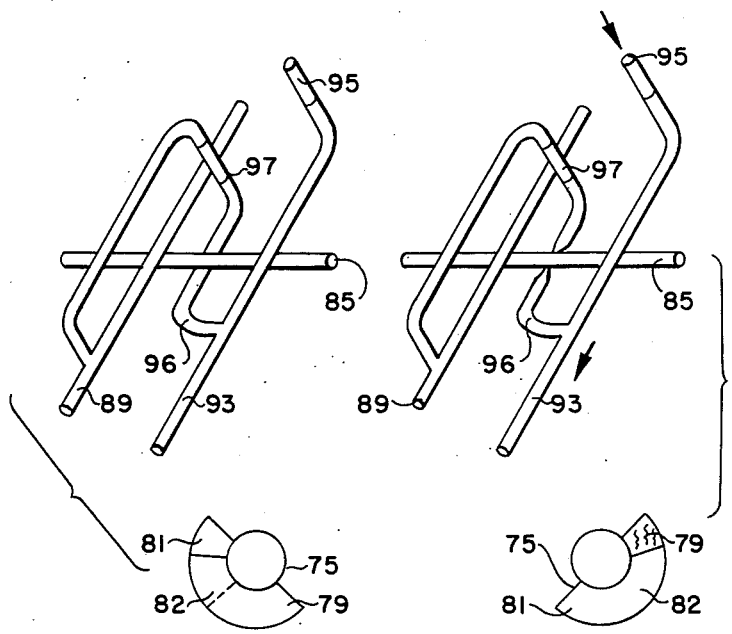

The operation of the present apparatus will best be illustrated by reference to the flow diagrams as shown in FIGURES 5 through 12. The flow diagrams illustrate the action of the sequential movements of the mercury displacement pump 75 and of the control bar 85 on the tubular gas displacement system. For the sake of clarity, the conduit 93, as shown in FIGURE 5, which perpendicularly transverses over control bar 85 and which communicates between the humidity cartridge 95 and displacement chamber 79 of the mercury displacement pump 75, is hereinafter referred to as the inlet passage 93. Conduit 89 which perpendicularly transverses over control bar 85 and communicates between the atmosphere and displacement chamber 81 of the mercury displacement pump 50 is hereinafter referred to as the exhaust passage 89. Conduit 96 which perpendicularly transverses under control bar 85 and communicates between inlet passage 93 on the pump side of control bar 85 and the exhaust passage 104 on the pump side of control bar 85 is hereinafter referred to as absorbent line 98 because the absorbent cartridge 97 is positioned in this conduit.

When the apparatus is in its normal position as illustrated in FIGURE 5, i.e., when the machine is at rest or when handle 31 is depressed less than its maximum leverage point, control bar 85, hereinbefore described will be neutrally positioned and the inlet passage 93, the exhaust passage 89, and the absorbent line 98 will be opened.

*Operation*

When the anesthesiologist desires to be appraised of the amount of carbon dioxide in the rebreathing system he merely forces handle 31 down to its maximum leverage point and releases it, at which time energized spring motor 33 will drive gear 36 by one-way clutch 35 imparting a two cycle movement of two positions each to mercury displacement pump 75 through pivot lever 76 whose follower roller 77 rides cam 48 which is rotated on shaft 45, and simultaneously imparting a two cycle movement of three positions each to control bar 85, in pressure chamber 88, whose follower roller 101 rides cam 47 which is also rotated on shaft 45.

In the first one-half cycle of movement, control bar 85 by its action, hereinbefore described, will close the absorbent line 98 and allow the intake passage 93 and the exhaust passage 89 to open, as illustrated in FIGURE 6. Sequentially the mercury pump 75 will then tilt and mercury piston 82 will fill the void in displacement chamber 81 and will simultaneously evacuate displacement chamber 79 thereby drawing a sample of the anesthesia gas stream from the close circuit rebreathing system (not shown) into humidity cartridge 95 through intake passage 93 into displacement chamber 79 as is also illustrated in FIGURE 6. At this point the relative humidity of the gas in the displacement system is standardized due to its contact with the humidifying agent contained in cartridge 95.

While the pump is held in the aforesaid position, as illustrated in FIGURE 7, the next sequential movement of control bar 85 will allow the absorbent line 98, the intake passage 83 and the exhaust passage 89 all to open momentarily thereby equalizing the system to atmospheric pressure. At this point the gas in the displacement system is substantially at atmospheric pressure.

In the next one-half cycle of movement, control bar 85, by its action will close intake passage 93 and exhaust passage 89 and allow the absorbent line 96 to open, sequentially the mercury pump 75 will then tilt to a new position so that mercury piston 82, by its action will fill the gas filled space in displacement chamber 79, displacing the gas back through the intake passage 93 into the absorbent line 98 and simultaneously displacement chamber 81 will become evacuated thereby drawing the displaced gas in the absorbent line 98 through the absorbent cartridge 97 into the displacement chamber 81 as illustrated in FIGURE 8. At this point the gas displaced through the absorbent cartridge 97 has had its carbon dioxide content substantially extracted.

While the pump is held in the aforesaid position, as illustrated in FIGURE 9, control bar 85 by its action will open the intake passage 93 and exhaust passage 89 and close the absorbent line 98.

In the third one-half cycle of movement, the mercury pump 75 will again tilt and the mercury piston 82, by its action will again fill the gas-filled space in displacement chamber 81, displacing the gas through the exhaust passage 89 to the atmosphere and simultaneously displacement chamber 79 will become evacuated thereby drawing a new sample from the anesthesia gas stream through the intake passage 93 to chamber 79 as illustrated in FIGURE 10. At this point the system has been substantially purged and the apparatus has started its analytical cycle. Also the new sample of gas drawn into the displacement system has had its relative humidity standardized by being contacted with the humidity agent in cartridge 95.

Figures 11, 12:
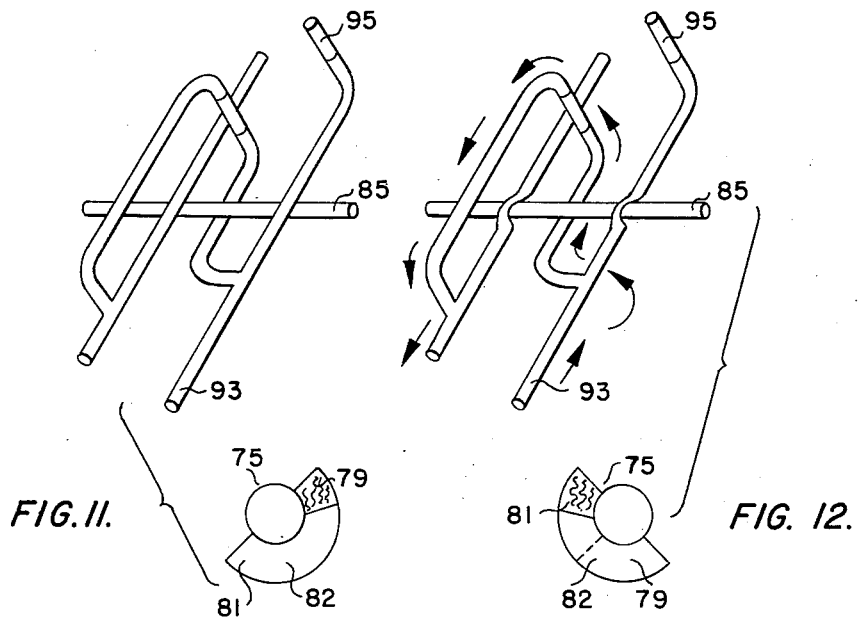

While the pump is held in the aforesaid position, as illustrated in FIGURE 11, the next sequential movement of control bar 85 will allow the absorbent line 98, the intake passage 93, and the exhaust passage 89 all to open momentarily thereby equalizing the system to atmospheric pressure. At this point the gas in the displacement system is substantially at atmospheric pressure.

In the next one-half cycle of movement, as illustrated in FIGURE 12, the next sequential movement of control bar 85 by its action will allow the absorbent line 98 to remain open but will close the intake passage 93 and exhaust passage 89, sequentially the mercury pump 75 will then tilt to a new position so that mercury piston 82 by its action will fill the gas-filled space in displacement chamber 79 displacing the gas back through the intake passage 93 into the absorbent line 98 and simultaneously displacement chamber 81 will become evacuated thereby drawing the displaced gas in the absorbent line 98 through the absorbent cartridge 97 into the displacement chamber 81. At this point the gas displaced through the absorbent cartridge 97 has had its carbon dioxide content substantially extracted and a pressure change is produced by such extraction which is proportional to the carbon dioxide content of the gas. The apparatus has completed its mechanical operation and the anesthesiologist may be quickly appraised of the amount of carbon dioxide in the system by a vacuum gauge directly connected to exhaust line 89 between the control bar 85 and the displacement chamber 81, as illustrated in FIGURE 12.

The present apparatus is automatically purged during the first full cycle of its operation. This purge cycle is utilized to remove any of the gas remaining in the system from a previous analysis thereby avoiding contamination of the sample upon which the final determination of carbon dioxide will be made.

The reading on the gauge is directly related to the carbon dioxide extracted from the displaced gas sample. This pressure reading is substantially unaffected by a pressure differential due to the exchange of moisture between the sample and the absorbent because the moisture content of the sample has been standardized prior to contact with the absorbent by passing the sample through the humidity cartridge 95. This standardization adjusts the moisture content of the sample to the amount of moisture which is in equilibrium with the absorbent and therefore when said sample is contacted with the absorbent substantially no moisture exchange will take place therebetween.

It will be apparent to those versed in the art that many modifications may be incorporated into the present invention without departing from the spirit of invention embodied therein.

Figure 13:
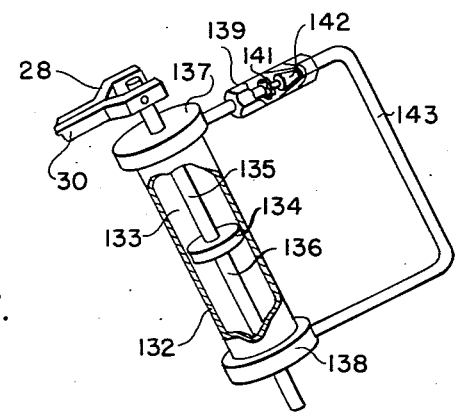
FIGURE 13 is a perspective view of a modified hydraulic dash-pot system, which may be utilized in the present device.

In illustration, FIGURE 13 sets forth a hydraulic dashpot system which may be utilized in place of the present system. This hydraulic dash-pot comprises cylindrical housing block 132, within which is housed cylindrical bore 133 adapted to receive double action piston 134 provided with connecting rods 135 and 136. The extremital ends of housing block 132 are provided with coupling caps 137 and 138 through which connecting rods 135 and 136 respectively extend.

The valve control of this system is attached to coupling cap 137 and comprises valve housing 139 within which is housed one-way valve 141 and needle valve 142. The function of one-way valve 141 is to allow the transfer of hydraulic fluid only from cylindrical bore 133 through valve housing 139 to tubing 143 back to cylindrical bore 133 through coupling 138. The function of needle valve 142 is to regulate the rate of flow of hydraulic fluid from cylindrical bore 133, through tubing 143, valve control housing 139, and into cylindrical bore 133 by way of coupling 137.

When handle 31 is depressed, connecting rod 135 is subjected to an upward pulling action because its cleave attachment point on arm 69 of segment gear 28 is raised due to the pivoting of segment gear 28 on shaft 29. The upward torque exerted on connecting rod 135 is in turn communicated to piston 134, to which said rod is attached, and piston 134 will ascend in cylindrical bore 133 creating an upward force which drives hydraulic fluid through coupling cap 137 into and by one-way valve 141 and thence through tubing 143 again into cylindrical bore 133 by way of coupling cap 138. The driving upward force created in the upper section of cylindrical bore 133 is also aided by a suction force created in the lower section of cylindrical bore 133 by the ascent of piston 134 therein.

In driving, energized spring motor 33, in FIGURE 1, rotates shaft 34. Gear 22, mounted on shaft 34, co-acts with segment gear 28 resulting in a downward movement of arm 69 due to the pivoting of segment gear 28 in shaft 29. When segment gear 28, in FIGURE 12, is subjected to a downward movement, piston 134 is forced to descend in cylindrical bore 133 by connecting rod 135 which is cleaved to segment gear 28. As piston 134 is forced to descend in cylindrical bore 133 it communicates a downward torque to the hydraulic fluid contained therein and the fluid is forced through coupling 138 into tubing 143 and into valve control housing 139.

At this point in the operation, one-way valve 141 will be closed by the force of the flow of the hydraulic fluid, and the hydraulic fluid will be directed through needle valve 142 which will control its rate of flow into cylindrical bore 133 by way of coupling 138.

A further modification which is applicable to the cartridges 95 and 97 lies in the fact that the cone apexes 121, 125 and closed ends of 124, 126 do not have to be adapted with a circumferential groove. The function of this groove is to aid in the respective removal of the apexes and closed ends of such cartridges, however, it has been found that such cartridges may be produced from plastic material by conventional processes in such a manner that the respective apexes and cones of such cartridges may be easily snipped off by an ordinary cutting edge without the utilization of a circumferential groove.

We claim:
1. Apparatus for determining the amount of carbon dioxide in a sample of an anesthetic gas, said apparatus comprising, in combination: a carbon dioxide extraction chamber adapted to operate at a standardized humidity; a humidity control chamber adapted to condition said sample to said standardized humidity, one end of which is adapted to receive said sample; differential pressure measuring means adapted to determine the differential pressure between an unknown pressure and a known pressure and to display the determination as the original car- bon dioxide content of said sample; drive means; a pump driven by said drive means and having cyclically operated inlet and exhaust displacement chambers of equal volumes and operating 180° out of phase; valved passageways interconnecting said chambers and said differential pressure measuring means; and valve actuating means driven by said drive means and regulating the valving of said passageways; said valved passageways comprising an inlet passageway connecting the other end of said humidity control chamber and said inlet displacement chamber, inlet valve means therein, an exhaust passageway connecting said exhaust displacement chamber with a vent, exhaust valve means therein, an absorbent passageway connecting one end of said carbon dioxide extraction chamber with said inlet passageway between said inlet valve means and said inlet displacement chamber and connecting the other end thereof with said exhaust passageway between said exhaust valve means and said exhaust displacement chamber, absorbent valve means therein between said carbon dioxide extraction chamber and said inlet passageway, and a measurement passageway connecting said exhaust displacement chamber to the unknown pressure receiving end of said differential pressure measuring means; said valve actuating means being operatively connected to each of said valve means and being adapted to open and close said passageways through said valve means in the following sequence of steps in relation to the phase of the pump:

(a) inlet displacement chamber filling—absorbent valve means closed, others open
(b) pause by pump—all valve means open
(c) inlet chamber emptying—absorbent valve means open, others closed 2. The apparatus of claim 1 wherein said valve actuating means operates through two of said sequence of steps per determination stopping at the end thereof with said inlet displacement chamber empty.

3. The apparatus of claim 1 wherein said pump is an oscillating mercury displacement pump, and comprising in addition thereto: a shaft driven with a uniform unidirectional circular motion by said drive means, a butterfly cam on said shaft, a butterfly cam follower operatively connected to said pump, a valve cam on said shaft and a valve cam follower operatively connected to said valve means, said valve cam being programmed to operate said valve actuating means through two of said sequence of steps in one revolution.

References Cited in the file of this patent

UNITED STATES PATENTS

| | | |
|---|---|---|
| 813,671 | Schlatter et al. | Feb. 27, 1906 |
| 1,611,164 | Condit | Dec. 21, 1926 |
| 1,634,331 | Mase | July 5, 1927 |
| 1,727,544 | Kemp | Sept. 10, 1929 |
| 1,740,462 | Hutton | Dec. 24, 1929 |
| 2,345,090 | Brace | Mar. 28, 1944 |
| 2,414,876 | Horwitz | Jan. 28, 1947 |
| 2,486,321 | O'Sullivan | Oct. 25, 1949 |
| 2,895,807 | Sorg et al. | July 21, 1959 |
| 2,940,834 | Ringrose | June 14, 1960 |

FOREIGN PATENTS

| | | |
|---|---|---|
| 516,992 | Great Britain | Jan. 17, 1940 |